Nov. 10, 1959     W. J. WEISS     2,911,904
AUTOMATIC TYING MECHANISM FOR BALERS

Filed June 21, 1955     4 Sheets-Sheet 1

Inventor
Webster J. Weiss
By
Emerson B. Donnell
Attorney

Nov. 10, 1959  W. J. WEISS  2,911,904
AUTOMATIC TYING MECHANISM FOR BALERS
Filed June 21, 1955  4 Sheets-Sheet 2
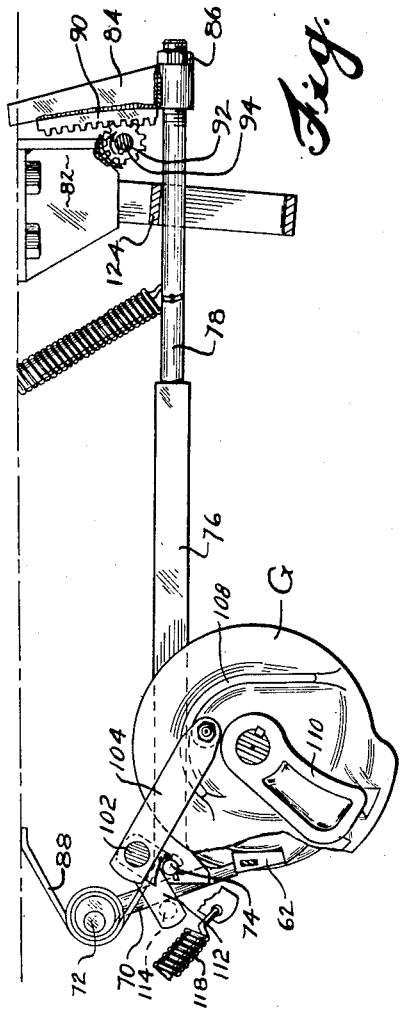
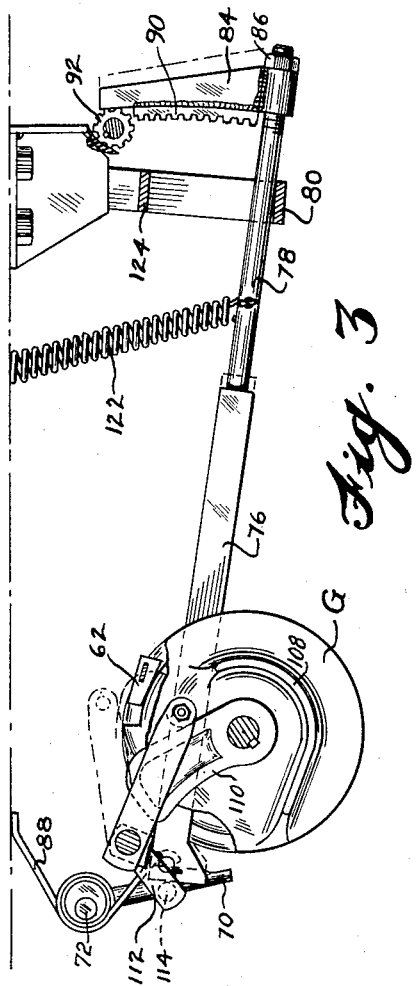
Inventor
Webster J. Weiss
By
Emerson B. Donnell
Attorney Nov. 10, 1959  W. J. WEISS  2,911,904
AUTOMATIC TYING MECHANISM FOR BALERS
Filed June 21, 1955  4 Sheets-Sheet 3
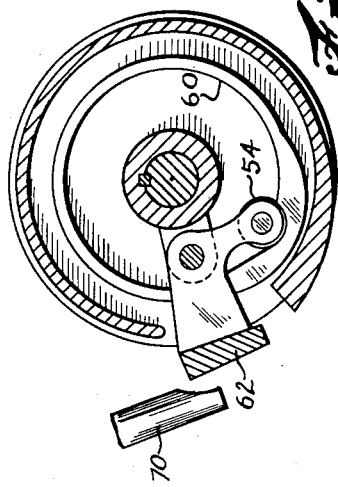
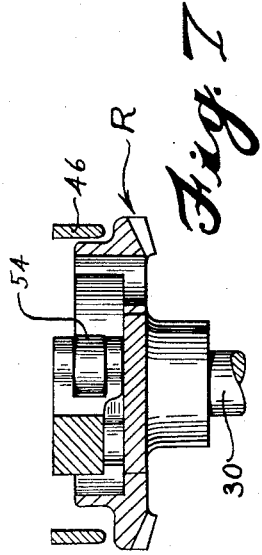
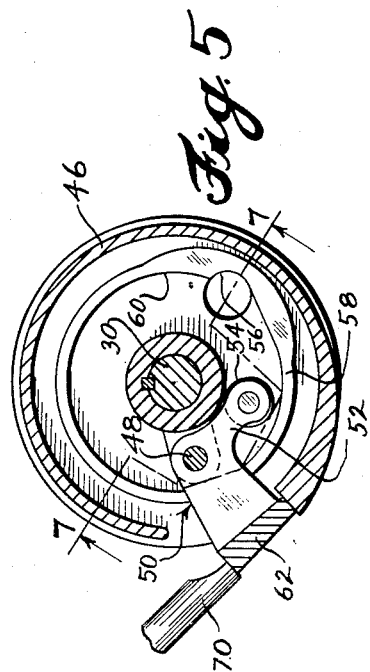
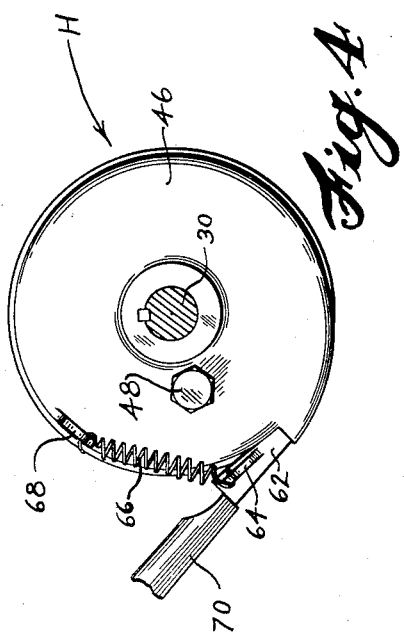
Inventor
Webster J. Weiss
By
Emerson B. Donnell
Attorney

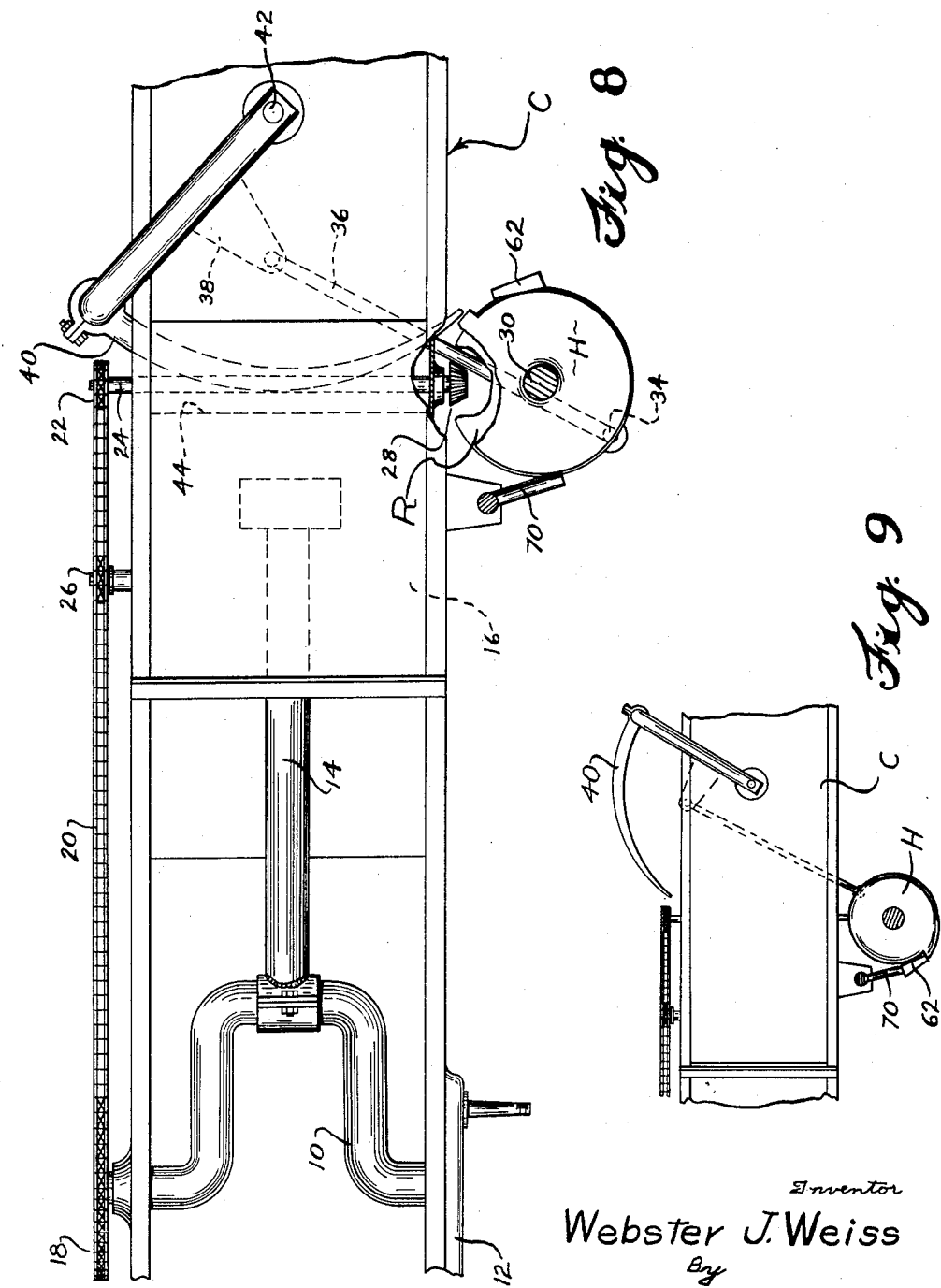

United States Patent Office 2,911,904
Patented Nov. 10, 1959

2,911,904

AUTOMATIC TYING MECHANISM FOR BALERS

Webster J. Weiss, Racine, Wis., assignor to J. I. Case Company, Racine, Wis., a corporation of Wisconsin Application June 21, 1955, Serial No. 517,007

10 Claims. (Cl. 100—4)

This invention relates to improvements in automatic tying mechanism for balers and an object thereof is to generally improve the mechanism operating when the desired length of bale has been attained and which will measure the length more accurately and consistently than previously known mechanisms, and which will trip the tying mechanism accurately and positively when the desired length has been reached.

A further object is to devise such a mechanism in which the desired length of bales may be readily selected.

Tying mechanisms in general have been known for many years and the present application does not concern itself with the tying mechanism as such. It is necessary however that whatever tying mechanism is used shall be accurately and unfailingly timed in relation to the usual baling plunger, and a further object of the invention is to devise a drive for a tying mechanism which can engage in one definite timed relation with the reciprocations of the plunger and in no other.

Further objects and advantages will become apparent from the following specification and annexed drawings in which:

Fig. 2 is a sectional view generally on the line 2—2 of Fig. 1 with parts broken away to show what lies beneath and with parts in a different position.

Fig. 3 is a similar view with the parts in a still different position.

Figure 4 is a plan view slightly enlarged of a cyclic clutch indicated in Fig. 1.

Fig. 5 is a horizontal sectional view of the same substantially on the line 5—5 of Fig. 1.

Fig. 6 is a similar view with the parts in a different position.

Fig. 7 is a vertical sectional view of the clutch on the line 7—7 of Fig. 5.

Fig. 8 is a plan view with parts removed and others broken away of the baler of Fig. 1, reduced in scale and partly diagrammatic in character showing a driving arrangement for the tying mechanism.

Fig. 9 is a similar view of a portion of Fig. 8 with the parts in a different position.

Figure 1:
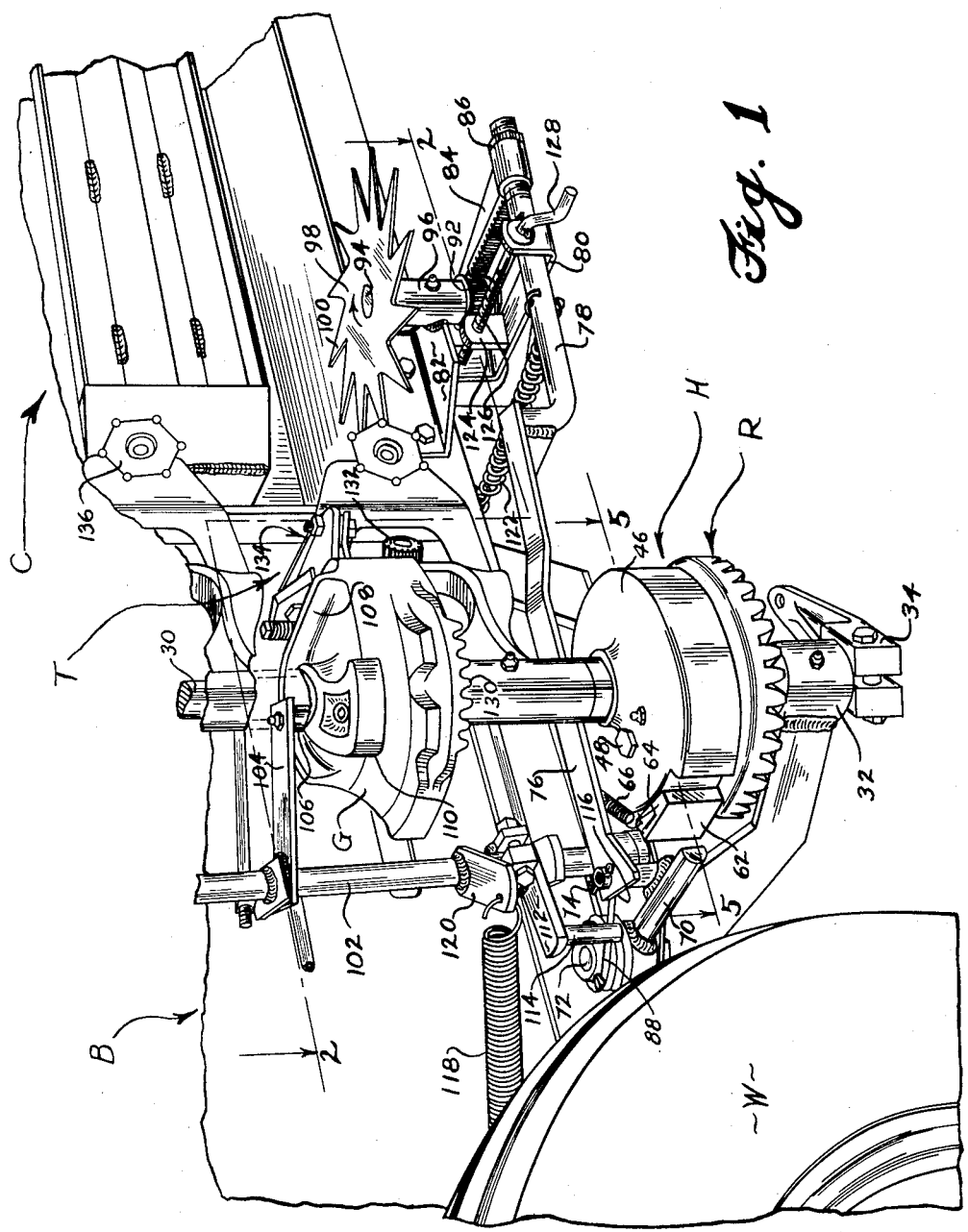
Figure 1 is a side view in perspective looking toward the rear from the left side of a self-tying baler, showing as much of the baler and its tying mechanism as is necessary for an understanding of the invention.

Similar reference characters have been applied to the same parts throughout the drawings and specification, in which an illustrative embodiment is shown, but it is to be understood that the invention is not to be taken as limited to the particular construction shown or uses mentioned except to the extent that this invention is defined in the appended claims, which are to be interpreted as broadly as is consistent with the state of the art.

Turning to Fig. 1 the device is shown installed on a baler generally designated as B having a supporting wheel W, a baling case or chamber C and tying mechanism T which may be of any suitable or well-known form within the contemplation of the invention, in the present instance the various operations of the tying cycle requiring and being completed by one revolution of the cam and interrupted gear unit G. Such revolutions are initiated by a cyclic clutch generally designated as H driven as necessary by a continually rotating gear R actuated from the baler mechanism. Turning to Fig. 8 a crank shaft 10 is rotated from suitable gearing of well-known type in a housing 12 and operates through a pitman 14 and a plunger 16, crop material being fed in advance of the plunger in a well-known manner and rotation of the crank shaft causing reciprocation of the plunger and compressing of the material in case C, the usual feeder mechanism, dogs and the like being present but omitted from the drawings since they form no part of the present invention. As is understood, tying mechanism T must be accurately timed in relation to plunger 16 and with this in view crank shaft 10 has a driving mechanism including a sprocket 18 driving through a chain 20, a sprocket 22 on a shaft 24, chain 20 being adjusted by means of the usual idler 26.

Shaft 24 carries a gear 28 which meshes with and drives the above-mentioned continuously running gear R best seen in Fig. 1.

Gear 28 for convenience is made smaller than gear R while sprocket 22 is made smaller by a corresponding amount than sprocket 18. According to the laws of mechanics sprocket 22 will then run faster than sprocket 18 whereas gear R will run slower than gear 28 and for the purposes of the invention the sizes of the gears and sprockets are so chosen that gear R will make exactly one revolution in the time that crank shaft 10 makes one revolution, and therefore gear R will remain in fixed angular or phase relation with crank shaft 10 at all times for purposes which will appear. It will now be apparent that at such times as clutch H is engaged, cam gear unit G and the associated tying mechanism will be forced to rotate at the same rate as gear R or crank shaft 10.

Gear R as more particularly shown in Figs. 7 and 8 is journaled for free rotation about a shaft 30 which however is also rotatable in suitable bearings as 32, Fig. 1, but held stationary except when actual tying is taking place, shaft 30 having a crank arm 34 connected by a link or pitman member 36 with an arm 38 projecting from a needle unit 40 pivoted on a pivot or bearing 42 supported from bale case C, cam gear unit G being keyed or otherwise fixed to shaft 30. As will be apparent, one complete rotation of shaft 30 will cause insertion of the needle 40 as seen in Fig. 8 to carry the tying material not shown to tying mechanism T in familiar manner, and retraction thereof to the position shown in Fig. 9, other details of the mechanism performing the actual tying operation in well-known manner and forming no part of the present invention.

Plunger 16 is slotted as at 44 to receive needle 40 so that the latter may pass freely through the slot rather than to be forced through the compressed hay, and it is important that needle 40 be advanced at the time that plunger 16 is in position to receive it. Therefore clutch H is so constituted as to be capable of locking shaft 30 in only one relation to gear R, and this relation is so chosen that the desired sequence of operations will be brought about. In other words clutch H engages shaft 30 in such a position that crank arm 34 through link 36 will pull needle 40 into bale case C just as plunger 16 arrives in position to receive it, needle 40 being pulled freely through slot 44 before plunger 16 starts its return movement.

Since gear R makes one complete turn exactly in synchronism with crank shaft 10 and since clutch H can engage shaft 30 in only one relation with gear R it is not possible for needle 40 to be pulled into bale chamber C at any time except in correct timed relation to the movements of plunger 16.

Returning to Figs. 4 and 7, clutch H comprises part of gear R and a cap-like housing 46, gear R as aforesaid rotating continuously while cap 46 remains stationary except when actual tying is being accomplished.

Cap 46 is keyed or suitably fixed to shaft 30 and carries a pin 48 about which is journaled a bell crank element 50, element 50 having an arm 52 carrying in the present instance a roller 54 engageable on occasion with a socket portion 56 in a cam track or rim portion 58 projecting upwardly from gear R within cap-like portion 46. As will be apparent, when roller 54 is engaged with socket 56 gear R will, through arm 52 and pin 48, propel cap-like portion 46 and cause it to rotate in unison with gear R. If roller 54 is projected against rim 58 at any time, prior to its engagement with socket 56 it will roll on an interior surface 60 of rim 58 and not cause rotation of cap-like portion 46. In other words it can lock shaft 30 with gear R in only one position as more particularly shown in Fig. 6 and, as will be understood, in the position shown in Fig. 5 gear R and accordingly rim portion 58 will rotate without engaging roller 54.

Bell crank 50 includes a control dog or block 62 having a perforated ear 64 engaged with a spring 66 anchored on an ear 68 on cap-like portion 46, spring 66 biasing bell crank 50 toward the position shown in Fig. 6 from which it is restrained by a latch finger 70, which also positively prevents rotation of cap portion 46 by engagement with block 62.

As will be apparent, if latch finger 70 is removed as seen in Fig. 6, at any time during the operation of the machine, roller 54 will be forced by spring 66 into contact with surface 60 and will drop into socket 56 and cause rotation of cap-like portion 46 and shaft 30 in the aforesaid predetermined relation with gear R as soon as socket 56 reaches the position of roller 54. Latch block 62 will of course rotate with cap portion 46 and, if latch finger 70 is restored to the Fig. 5 position block 62 will encounter finger 70 and stop the movement of block 62. Short continued movement of cap portion 46 will then withdraw roller 54 from socket 56 as seen in Fig. 5 so that gear R may continue to rotate without driving cap portion 46. In this way, regardless of the time in relation to the rotation of crank shaft 10 that finger 70 is withdrawn, clutch H will actuate needle 40 to enter bale case C at precisely the correct time in relation to the reciprocation of plunger 16. Finger 70 is controlled by mechanism actuated by the bale being formed as will now be described.

Returning to Fig. 1, finger 70 is pivoted on a pin 72 suitably supported from the baler and has a pin 74 on which is journaled a push rod 76 which extends rearwardly transversely to finger 70 and has a continuing portion 78 guided in an adjustable yoke 80 carried on bale case C by means of a bracket 82. Portion 78 has a movable bracket 84 transversely fixed thereon (see also Figs. 2 and 3) and adjustable in suitable manner axially of portion 78 as by a nut 86. Above-mentioned finger 70 is biased by a spring 88, in the present instance coiled about pin 72 and engaged with above-mentioned pin 74, to the left as seen in Figs. 1, 2 and 3, or in the direction to remove finger 70 from block 62. This condition is seen in Fig. 3 but as seen in Fig. 2 finger 70 is maintained in contact with block 62 by reason of a rack or gear segment 90 engaged with a gear 92 carried on a shaft 94 journaled in a bearing 96, Fig. 1, with which is fixed a star wheel or measuring wheel 98 having points 100 positioned to encroach somewhat on the path of the bales through case C so that wheel 98 is turned by the movement thereof.

As will be apparent from Fig. 2 rod 76 cannot be urged to the left by swinging of finger 70 by reason of urging of spring 88 since rack segment 90 is prevented from so moving by contact with gear 92. Wheel 98 however being turned by movement of the bale passing through case C rotates gear 92 in the direction indicated causing movement of rack segment 90 in a direction toward the observer. Rod 76 however merely swings about the pin 74 until segment 90 has moved far enough so that the end of it runs off of gear 92. At this point, as seen in Fig. 3 spring 88 is able to swing finger 70 to the left to the extent permitted by the portion of bracket 84 beyond the end of rack 90 and leaves block 62 to start the action of clutch H as hereinbefore described. The action of clutch H then carries out the tying cycle and also resets rod 76 and rack 90 in position to measure another bale as will now be described.

A rock shaft 102 is suitably supported in relation to interrupted gear and cam element G to be rocked at suitable intervals as part of the tying cycle by an arm 104 having a cam follower or roller 106 engageable with cam track 108 and with a cam segment 110, the latter in the present instance being formed on or secured to interrupted gear and cam element G. Rock shaft 102 also has an arm 112 carrying a pin or projection 114 positioned to contact, when arm 112 is swung by rocking of the shaft, the surface 116 on rod 76. It will now be apparent that when finger 70 is disengaged from block 62 by leftward movement of rod 76, initiating rotation of shaft 30 through clutch H that interrupted gear and cam element G being fixed to shaft 30, will also rotate and, after block 62 has passed finger 70 roller 106 will be contacted by cam segment 110, swinging arm 104 in a direction away from the observer or in a counterclockwise direction viewed from above. Such rotation of arm 112 will bring pin 114 into contact with surface 116 thereby forcing rod 76 to the right as seen in Fig. 1. An assisting spring 118 anchored to a suitable part of the baler is connected to an arm 120 fixed on rock shaft 102 and opposes the latter actuation of said shaft, normally forcing roller 106 to follow the contour of cam segment 110 rather than to be guided by cam track 108. The latter positively actuates roller 106 and arm 104 toward the observer in the event that rock shaft 102 is prevented from following the urging of spring 118 for any reason.

Turning now to Fig. 3 it will be observed that segment 90 is resting at its end against gear 92 while at the same time it is urged away from the observer, back toward the position of Fig. 2 by a spring 122. When pin 114 operates to push rod 76 to the right, into the position suggested in dotted lines, Fig. 3, rack 90 escapes from gear 92 and the assemblage is quickly returned to the position shown in Fig. 2, rod portion 78 coming to rest against a stop 124. Continued rotation of interrupted gear and cam element G allows the return of pin 114 to the position shown in Fig. 1 leaving rod 76 free to be urged toward the left to engage the teeth of rack 90 with those of gear 92 so that continued operation, resulting in rotation of gear 92, will again start movement of rack 90 toward the position shown in Fig. 3. In this way the mechanism is tripped to start the tying action with great accuracy whenever the material being baled reaches the desired predetermined length.

This length will depend upon the number of teeth of rack 90 which traverse gear 92 before rack 90 runs off of gear 92 as seen in Fig. 3, and this number will depend upon the position of stop 124. As seen in Fig. 1 stop 124 is threaded on a rod 126 journaled in yoke 80 and having a crank or other suitable actuating handle 128 for rotation. By this means stop 124 may be readily adjusted along yoke 80 to control the return movement of rack 90 to thereby position as many or as few of the teeth of rack 90 as may be desired to traverse gear 92 prior to tripping of the mechanism, and this adjustment may readily be made without the slightest danger to the operator while the mechanism is running.

Gear teeth 130 represent a part of the tying mechanism as does gear 132, while numeral 134 indicates part of the tying or knotting mechanism forming no part of the invention and which need not be further described for this reason. 136 is a hand actuated nut which may be released when it is necessary to temporarily remove parts of the knotting mechanism to obtain access thereto. This also forms no part of the present invention.

The operation of the arrangement is thought to be clear from the above description and what is claimed as new and desired to be secured by Letters Patent of the United States is:

1. In a tying mechanism for a baler having a baling chamber, a driving shaft, a compressing plunger, and mechanism for causing reciprocation of said plunger in synchronism with the rotations of said driving shaft, mechanism for tying a binding element about a bale formed in said baling chamber and including a self interrupting clutch in driving relation to said tying mechanism comprising a continuously rotating driving element, and a driven element engageable with said driving element in a single predetermined position relatively to said driving element; the combination with said baler of driving means connected with said continuously rotating driving element and constituted to cause rotation of said driving element in synchronism with the rotations of said driving shaft in fixed angular relation therewith whereby said clutch can actuate said tying mechanism relative to the reciprocation of said plunger, a bale sizing wheel supported in such a position as to be rotated by a bale being formed and traversing said chamber, a trip latch mechanism positioned to engage and maintain said driven element disengaged from said driving element and thereby said driven element in an inoperative position, a gear driven by said sizing wheel, an arm connected with said trip latch, resilient means for yieldingly urging said arm in a direction to disengage said trip latch, a rack fixed on and transverse to said arm and urged into engagement with said gear by said resilient means, and said rack having an end portion constituted to run off of said gear to allow said resilient means to release said trip latch.

2. In a tying mechanism for a baler having a baling chamber, a driving shaft, a compressing plunger and mechanism for causing reciprocation of said plunger in synchronism with the rotations of said driving shaft, and mechanism for tying a binding element about a bale formed in said baling chamber and including a self interrupting clutch in driving relation to said tying mechanism comprising a continuously rotating driving element and a driven element engageable with said driving element in a single predetermined position relatively to said driving element; the combination with said baler of driving means connected with said continuously rotating driving element and constituted to cause rotation of said driving element in synchronism with the rotations of said driving shaft in fixed angular relation therewith whereby said clutch can actuate said tying mechanism in relation to the reciprocation of said plunger, a bale sizing wheel supported in position to be rotated by a bale being formed and traversing said chamber, a trip latch mechanism positioned to engage and maintain said driven element disengaged from said driving element, and thereby said driven element in an inoperative position, a gear driven by said sizing wheel, an arm connected with said trip latch, resilient means for yieldingly urging said arm in a direction to disengage said trip latch, a rack fixed on and transverse to said arm and urged into engagement with said gear by said resilient means, and said rack having an end portion constituted to run off of said gear to allow said resilient means to release said trip latch, and means actuated through said driven element to overcome said resilient element and return said rack into engagement with said gear.

3. In a tying mechanism for a baler having a baling chamber, a driving shaft, a compressing plunger, mechanism for causing reciprocation of said plunger in response to rotation of said driving shaft, and mechanism for tying a binding element about a bale formed in said baling chamber and including a self-interrupting clutch in driving relation to said tying mechanism; the combination with said baler of driving means connected between said driving shaft and said self-interrupting clutch whereby said clutch can actuate said tying mechanism, and means to control said clutch including a bale sizing wheel supported in position to be rotated by a bale being formed and traversing said chamber, a gear driven by said sizing wheel, a push rod extending from said self-interrupting clutch to the region of said gear, a rack fixed on and transverse to said push rod, resilient means connected in relation to said push rod and rack to continuously urge said rack toward meshing relation with said gear and to also urge said push rod toward said gear, mechanism connected with said push rod remote from said rack responsive to lengthwise movement of said push rod caused by said resilient means when rotation of said gear by said sizing wheel causes said rack to run off of said gear, said mechanism acting to initiate action of said clutch to effect tying of a binding element, and mechanism also activated by action of said clutch and positioned to force said push rod lengthwise in the direction of said gear, against the force of said resilient means to free said rack from said gear whereby said resilient means will shift said push rod toward said gear and said rack to a position to reengage said gear, and a stop limiting the movement of said push rod toward said gear to establish a starting point for said rack to engage said gear, by reason of the urging of said resilient means.

4. A device in accordance with claim 3 in which said stop is adjustable into another position to establish a different starting point for said rack for determining desired lengths of bales.

5. In a tying mechanism for a baler including a bale case, means for compressing and moving a bale through said case and mechanism for tying binding elements about bales formed in said case including a self-interrupting clutch, the combination of a measuring wheel positioned to be rotated by bales passing through said case, a gear connected to and rotatable by reason of rotation of said measuring wheel, a rack meshed with said gear and of a length to run off said gear after a predetermined amount of rotation thereof, means urging said rack in the direction of its length opposite to that in which it is moved by rotation of said gear and also in a direction to mesh with said gear, mechanism connected with said rack and said clutch and constituted to trip said clutch upon movement of said rack in the last-mentioned direction beyond the position defined by meshing of said rack with said gear, and mechanism actuated by said clutch when tripped, for shifting said rack in a direction opposite to said last-mentioned direction, whereby said urging means may return said rack to a position to reengage said gear when released by said mechanism actuated by said clutch.

6. In a tying mechanism for a baler including a bale case, means for compressing and moving a bale through said case and mechanism for tying binding elements about bales formed in said case including a self-interrupting clutch, the combination of a measuring wheel positioned to be rotated by bales passing through said case, a gear connected to and rotatable by reason of rotation of said measuring wheel, a rack meshed with said gear and of a length to run off said gear after a predetermined amount of rotation thereof, means urging said rack in the direction of its length opposite to that in which it is moved by rotation of said gear and also in a direction to mesh with said gear, mechanism connected with said rack and said clutch and constituted to trip said clutch upon movement of said rack in the last-mentioned direction beyond the position defined by meshing of said rack with said gear, mechanism actuated by said clutch when tripped, for shifting said rack in a direction opposite to said last-mentioned direction, whereby said urging means may return said rack to a position to reengage said gear when released by said mechanism actuated by said clutch, and a stop positioned to arrest motion of said rack in said last-mentioned direction to establish a desired position of engagement of said rack with said gear to determine the length which will be attained by a bale when said clutch is tripped.

7. In a tying mechanism for a baler including a bale case, means for compressing and moving a bale through said case and mechanism for tying binding elements about bales formed in said case including a self-interrupting clutch, the combination of a measuring wheel positioned to be rotated by bales passing through said case, a gear connected to and rotatable by reason of rotation of said measuring wheel, a rack meshed with said gear and of a length to run off said gear after a predetermined amount of rotation thereof, means urging said rack in the direction of its length opposite to that in which it is moved by rotation of said gear and also in a direction to mesh with said gear, mechanism connected with said rack and said clutch and constituted to trip said clutch upon movement of said rack in the last-mentioned direction beyond the position defined by meshing of said rack with said gear, mechanism actuated by said clutch when tripped, for shifting said rack in a direction opposite to said last-mentioned direction, whereby said urging means may return said rack to a position to reengage said gear when released by said mechanism actuated by said clutch, and a stop positioned to arrest motion of said rack in said last-mentioned direction, said stop being adjustable into another position to establish desired positions of engagement of said rack with said gear to determine desired lengths of bales which will be attained when said clutch is tripped.

8. In a tying mechanism for a baler including a bale case, means for compressing and moving a bale through said case and mechanism for tying binding elements about bales formed in said case including a self-interrupting clutch, the combination of a baler frame means, a measuring wheel positioned on a shaft journalled in the frame and adapted to be rotated by a bale passing through the bale case, a member connected to the shaft and rotatable therewith, a reciprocable member disposed adjacent the first member and defining a first interengaging surface portion adapted to being engaged by said first member during which relative movement takes place between the rotatable and reciprocable members, and a recessed portion, a first mechanism interconnecting said clutch and said reciprocable member and constituted to trip said clutch when the rotatable member engages the recessed portion of the reciprocable member, resilient means connected to said first mechanism and baler frame for urging the reciprocable member in the direction of its length opposite to that in which it is moved by rotation of said first member and also in a direction to engage said first member, and a mechanism actuated by said clutch when tripped for moving the reciprocable member out of engagement with the rotatable member, whereby said resilient means may return the reciprocable member to a position to reengage said rotatable member when released by said last mentioned mechanism.

9. A device in accordance with claim 8 in which adjustable stop means is provided between the mechanism interconnecting the reciprocable element with said clutch and the bale frame whereby the length of the interengaging surface of the reciprocable member can be regulated to obtain the length of bales desired.

10. In a tying mechanism for a baler including a bale case, means for compressing and moving a bale through said case and mechanism for tying binding elements about bales formed in said case including a self-interrupting clutch, the combination of a measuring wheel positioned to be rotated by bales passing through said case, a rotatable member connected to and rotatable by reason of rotation of said measuring wheel, a reciprocable member disposed adjacent the first member and defining a first interengaging surface portion adapted to being engaged by said first member during which relative movement takes place between the rotatable and reciprocable members and a recessed portion, means urging said reciprocable member in the direction of its length opposite to that in which it is moved by rotation of said rotatable member and also in a direction to engage with said rotatable member, mechanism connected with said reciprocable member and said clutch and constituted to trip said clutch upon movement of said reciprocable member in the last-mentioned direction to where the rotatable member engages the recessed portion of the reciprocable member, and mechanism actuated by said clutch when tripped, for shifting said reciprocable member in a direction opposite to said last-mentioned direction, whereby said urging means may return said reciprocable member to reengage said rotatable member when released by said mechanism actuated by said clutch.

References Cited in the file of this patent

UNITED STATES PATENTS

| 2,546,324 | Tuft et al. | Mar. 27, 1951 |
| 2,604,844 | Hill | July 29, 1952 |
| 2,620,724 | Berry | Dec. 9, 1952 |
| 2,701,517 | Hauswirth | Feb. 8, 1955 |
| 2,746,584 | Skromme | May 22, 1956 |

FOREIGN PATENTS

| 705,457 | Germany | Apr. 29, 1941 |